Feb. 15, 1966  A. W. SEAR ETAL  3,234,665
SIMULATED PERISCOPE APPARATUS
Filed Nov. 6, 1961
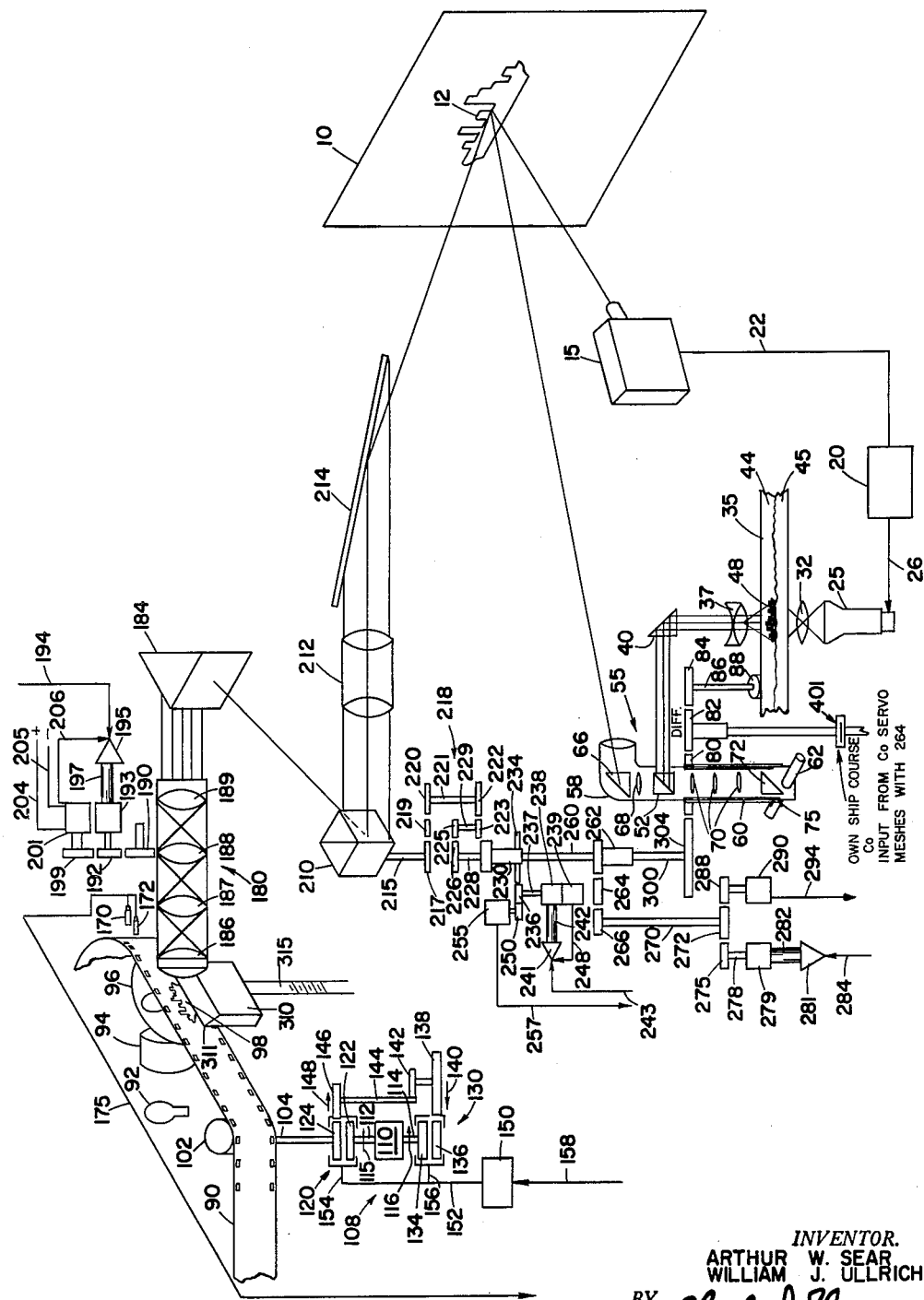
INVENTOR.
ARTHUR W. SEAR
WILLIAM J. ULLRICH
BY Charles J. Ungemach

United States Patent Office 3,234,665
Patented Feb. 15, 1966

3,234,665
SIMULATED PERISCOPE APPARATUS
Arthur W. Sear, Duarte, and William J. Ullrich, Glendora, Calif., assignors to Honeywell Inc., a corporation of Delaware
Filed Nov. 6, 1961, Ser. No. 150,260
8 Claims. (Cl. 35—25)

This invention relates to control apparatus and more specifically to apparatus for simulating objects as viewed in a natural background.

For purposes of adequately training personnel such as submarine crews it is desirable to be able to simulate the conditions which will be encountered without the necessity of actually providing real equipment. The present invention provides apparatus which simulates the view seen through a periscope of a submarine in a realistic manner to give the crew being trained every possible feeling of actual conditions.

Briefly, the invention comprises an optical system which projects a plurality of pictures onto a screen representative of targets such as ships for example, and provides apparatus which views these projected images and superimposes them on a background in such a manner that the ships can be made to move with respect to the background and with respect to the simulated submarine. Apparatus is further provided which allows movement of the simulated periscope and changes the view seen therethrough with motion of the periscope. Many other features of the present invention will become clear upon an examination of the following specification and claims read in conjunction with the drawing in which the present invention is shown in schematic form.

Referring now to the drawing, a screen 10 is shown which is normally totally dark and upon which an image 12 of a target such as a ship is projected in full color. The projection apparatus will be later described but for the time being it should be stated that the image of the target 12 may be made to move across the screen 10 in a realistic manner, may be made larger or smaller to simulate various ranges for the target with respect to the submarine and may be made to turn so as to present various angular views of the target 12 to simulate various attitudes between the target 12 and the simulated submarine. Also, although only one target 12 has been shown for simplicity, any reasonable number of targets may be independently projected on screen 10.

As stated, the image of the target 12 exists in full color on the otherwise dark screen 10 and means are provided to view this image and to create a picture thereof which is reversed, that is a picture which provides a dark image of the target 12 on an otherwise light background. As shown in the preferred embodiment this means comprises a television camera 15 mounted so as to observe screen 10 and the image of the target 12. The signal from the television camera 15 is presented to a special effects amplifier 20 by means of a conduit 22 and thence to a television receiver 25 by means of a conduit 26. The special effects amplifier 20 operates in a manner well known to the art to blank the images received by the television camera 15 so that the image of the face of the receiver 25 is a dark representation of the image 12 in an otherwise light background. This image may be described as a silhouette of the target which image is viewed by an optical system including a lens 32, a film strip 35, a lens 37 and a prism 40. The film strip 35 has an image of a background scene continuously shown thereon. Such an image is normally a portion representing sky and shown by reference numeral 44 and a portion representing the sea shown by reference numeral 45. Other images such as clouds or sun glare may be placed on the film strip 35. You may not put opaque images such as landscapes on the background film, otherwise a ship could be made to appear "sailing on land." Islands or landscape must be projected on screen 10 the same as targets 12 and the system was always intended this way. Film strip 35 is placed in the beam between lens 32 and lens 37 so that a composite image is formed by lens 37 showing the background except for dark portions representing the targets. This dark portion of the target has been shown on the film strip by reference numeral 48 and exists because that portion of the film strip 35 is not illuminated by the receiver 25. When several targets such as 12 appear on screen 10, each will be silhouetted in a similar manner.

The image of the background including the dark portion representing the ship's image is directed by the prism 40 to a beam-splitting prism 52 located in a simulated periscope 55. The simulating periscope 55 has an upper portion 58 which is fixed and is continuously directed to observe the screen 10 and the images thereon, and has a lower portion 60 which is rotatable by the submarine operator by means of handles 62 to give the operator a more realistic feeling of a real periscope. In the upper portion 58 of the simulated periscope 55 is mounted a prism 66 which directs the image 12 observed on screen 10 downwardly through a lens 68 and through the beamsplitter prism 52. When properly adjusted the full color image observed by the upper portion 58 of periscope 55 will be superimposed upon the background image directed from prism 40 in beam-splitter 52 so that a montage is created with the full color image exactly filling the dark portion or silhouette of the target from the film strip 35. The montage is directed by lenses 70 to a prism 72 and thence out the eye piece 75 of the simulated periscope 55 for viewing by the operator. The operator thus sees the full color image of the target in a full color natural background, without the use of color TV.

Connected to the lower portion 60 of the simulated periscope 55 and rotatable therewith is a gear 80 which meshes with a second gear 82 which in turn meshes with a third gear 84. Gear 84 is connected by a shaft 86 with a driving sprocket 88 connected to the film strip 35. By this last described gearing arrangement rotation of the lower portion 60 of the simulated periscope 55 results in movement of the film strip 35 and by this means simulates the natural movement of the background when the simulated periscope is rotated.

To understand how the target image 12 also moves upon rotation of the simulated periscope 55 a description of the optical system projecting the target on screen 10 is advisable. As shown in the figure, a film 90 is mounted for movement past a projector light 92, a condensing lens 94 and a shutter 96. A number of images of a realistic target have been developed on film 90 one of which is shown as an image 98. Image 98 is shown in profile while the other images may be at various angular positions of the same target. Thus by moving film strip 90 to a different position a different angular image of the target 98 will be projected onto screen 10.

As shown in the figure, film strip 90 is moved by a driving wheel 102 which is connected to a shaft 104 and a clutch and motor arrangement 108. The clutch and motor arrangement comprises a motor 110 having two output shafts 112 and 114 respectively. Output shafts 112 and 114 rotate in a direction shown by arrows 115 and 116 respectively. A clutch 120 has a driving wheel 122 connected to shaft 112 and has a following wheel 124 connected to shaft 104. Upon energization of clutch 120, driving wheel 122 operates to move following wheel 124 and thus shaft 104 and driving wheel 102 to move film strip 90 in a first direction. A second clutch 130 is shown having a driving wheel 134 connected to shaft 114 and a following wheel 136 connected to a gear 138. Energization of clutch 130 causes the driving wheel 134 to rotate the following wheel 136 which causes the gear 138 to rotate in a direction shown by arrow 140. Rotation of gear 138 causes a gear 142 to rotate which gear meshes with a shaft 144 connected to a gear 146. Gear 146 rotates in a direction shown by arrow 148 and meshes with the following wheel 124 of clutch 120. It is thus seen that when clutch 130 is energized the following wheel 124, shaft 104 and drive wheel 102 will move film strip 90 in a direction opposite to that when clutch 120 is energized. When neither clutch is energized, film 90 remains stationary. Energization of clutches 120 and 130 is accomplished in a standard manner by means of a film advance amplifier 150 which is connected to the clutches by a conductor 152 and conductors 154 and 156 respectively. The input film advance amplifier 150 is shown as an arrow 158. When it is desired to change the target's angle, a signal of predetermined phase is presented to film advance amplifier 150 from the input 158. The appropriate clutch 130 is then energized which allows motor 110 to drive film strip 90 either forward or in reverse until the desired angular position of the ship's image is presented. The film strip 90 is then stopped and the projection system shows an image on screen 10 with a target image 12 in the correct angular position. In the preferred embodiment of the invention we have placed 360 images on film strip 90, each of which is approximately one degree of angular difference to its neighbor so that complete rotation of the target is possible.

As stated, the image 98 on film strip 90 is placed in the path of light from the projection lamp 92 through the condensing lens 94. A lens system shown by arrow 180 is placed to receive the light through film strip 90 and operates the image 98 to a prism 184. The lens system 180 may be referred to as a double zoom system comprising a plurality of lenses 186, 187, 188 and 189. This double zoom system includes mechanism to move lenses 186, 187, 188 and 189 with respect to each other and thus increase or decrease the size of the projected image while maintaining the proper focus. The double zoom system is controlled by apparatus shown as a gear 190 which meshes with a gear 192 connected to a motor 193. Rotation of motor 193 causes rotation of gear 192 and gear 190 in a manner to adjust the double zoom system so that the desired size of the image is created. Operation of motor 193 may be controlled by an input 194 to an amplifier 195. Amplifier 195 controls motor 193 by means of a conduit 197. The phase of the signal on input 194 determines the direction of rotation of motor 193 and thus determines whether the image will increase or decrease in size. Motor 193 operating through gear 192 also moves a gear 199 which controls a potentiometer 201. This potentiometer is energized by conductors 204 and 205 and has an output on conductor 206 which is returned to the input of amplifier 195 to accomplish rebalance in a standard manner.

The image projected to prism 184 is deflected to a movable prism 210 and thence through a lens system 212 to a mirror 214 which is placed so as to direct the image to the desired position on screen 10. Prism 210 is rotatable and operates to move the target image 12 across screen 10. A shaft 215 is connected to prism 210 and to a gear 217 which in turn is connected to a gearing arrangement 218 made up of gears 219, 220, shaft 221, gear 222, gear 223, shaft 224, gear 225 and gear 226. Rotation of gear 226 operates through the gear arrangement 218 to rotate prism 210 and thus move the target image 12 across the screen 10. However, since rotation of prism 210 results in an apparent movement of image 12 of twice the amount of rotation of prism 210, gearing arrangement 218 is so constructed that the rotation of gear 226 results in half of that rotation of prism 210. Thus a rotation of $\theta$ degrees of gear 226 results in a rotation of $\theta/2$ degrees for prism 210 which produces $\theta$ degrees rotation for the image of target 12 of screen 10.

Gear 226 is connected to a shaft 228 which is connected to a differential 230. Differential 230 is connected to a gear 234 which in turn meshes with a gear 236 connected to a shaft 237 rotatable by a motor 238 and velocity generator 239. Rotation of motor 238 operates through shaft 237 and gear 236 to rotate gear 234 and through differential 230 to rotate shaft 228 and gear 226 and thus move prism 210. Rotation of motor 238 is accompanied by rotation of velocity generator 239 to create a signal on conductor 248 which is fed to the input of amplifier 241 in a standard manner to provide rate feedback. Rotation of motor 238 also causes rotation of a gear 250 which meshes with gear 236 and operates to produce a signal from a converter 255 on a conductor 257 for purposes of position feedback and rebalance. When it is desired to change the target bearing, a signal of the correct phase is presented to the input of amplifier 241 on conductor 243 which causes operation of motor 238 and consequent rotation of prism 210 to change the apparent bearing of the target image 12 on screen 10.

Also connected to differential 230 is a shaft 260 connected to a differential 262 which in turn is connected to a gear 264 meshing with a gear 266 connected to a shaft 270 and a gear 272. Rotation of gear 272 is accompanied by rotation of shaft 270, gears 266 and 264, differential 262, shaft 260, differential 230 and consequent rotation of prism 210 through gearing arrangement 218. Gear 272 is caused to rotate by a gear 275 connected to a shaft 278 of a motor 279 which is energized by an amplifier 281 by means of a conduit 282. Amplifier 281 has an input shown as arrow 284. When it is desired to change the position of the target due to motion of the submarine (Co, Own ship) a properly phased signal representative of own ship's course is presented on input 284 etc. input 284 which operating through 281 to cause motor 279 to turn and thus turn gear 272 to ultimately result in rotation of prism 210. As previously described, an input to amplifier 241 on conductor 243 results in rotation of prism 210; this rotation is for purposes of simulating the change in bearing of the target due to target motion while the input to amplifier 281 from conductor 284 causes rotation of prism 210 to simulate own ship course position change of the submarine. Both of these rotations may occur simultaneously and differential 230 will allow each to produce its effect in a realistic manner. Rotation of gear 272 also rotates a gear 288 which causes a signal from a converter 290 to be presented on a conductor 294 for purposes of position feedback and rebalance of the own ship's course (Co) servo.

After the initial position of the periscope is simulated by causing motor 279 to operate gear 272 to a desired angular position, further rotation of the simulated periscope 55 by handles 62 also causes apparent motion of the target image 72 across the screen 10. This motion is accomplished by means of a shaft 300 connected to the differential 262 and connected to a gear 304 which meshes with the gear 80 connected to the lower portion 60 of the simulated periscope 55. It is seen that rotation of lower portion 60 of periscope 55 results in rotation of gear 80 and thus rotation of gear 304 which operates through shaft 300, differential 262, shaft 260, differential 230, shaft 282, gear 226 of gearing mechanism 218, shaft 215 and prism 210 to move the target image 12 across the screen 10. As previously stated rotation of the lower portion 60 of simulated periscope 55 also causes movement of film strip 35 to change the background orientation so that upon rotation of the lower portion 60 of periscope 55 both the background and the target image 12 are caused to move in synchronism and present a realistic apparent motion of the simulated periscope 55.

To simulate the horizon and its effect on the target image 12 a block 310 is shown having an edge 311 which is stationary with respect to screen 10. Rotation of gear 315 causes vertical movement of the projector and film with respect to edge 311 so that as the target image apparently moves further away, it (target 12) can be caused to lower and create the appearance on screen 10 of the target 12 falling below the horizon. Own ship's course input 284 is also coupled through gear 264 to gear 401 to cause simultaneous motion of the background film through differential 82, gear 84, shaft 86 and sprocket 88 at the same time prism 210 is rotated by the own ship's course servo as previously described.

It is thus seen that apparatus has been provided to cause a realistic view as seen through a periscope in a submarine and which operates in such a manner that the target observed may change range, bearing or aspect angle and may move with respect to a natural background. Further it is seen that rotation of the simulated periscope creates movement of the image and the background in a realistic manner. It is also seen that the target image may be caused to move in any desired manner upon proper signals being presented to the system as for example, by an instructor. It should be obvious to those skilled in the art that the signals changing the appearance of the target image may be provided automatically from a suitable computer so that a predetermined course for the target may be simulated. More specifically, the inputs 158 aspect angle, and 194 range, 243 target true bearing, and 284 own ship course, may be supplied from a computer to cause the image 12 of the target to move in any desired predetermined manner. It should also be realized that while the invention has been shown for use with a simulated periscope for a submarine that this is not necessarily the only mode in which the present invention may be practiced. For example, the same apparatus can be used for training aircraft crews by simulating the appearance of various aircraft targets in a natural background or can be used in a number of applications such as driver training or to simulate targets on a firing range. Furthermore while the invention has been described as placing only a single target on the screen, in the normal use of the invention multiple systems as herein described will be employed so that a number of target images will be simultaneously displayed on the screen 10. We have found it desirable to supply as many as 14 target projector systems each independently operable so as to create a complete simulated situation for the submarine crew. Using this technique the individual target ships can each be manuvered in various angular positions and ranges with respect to a natural background to provide a maximum of realism to the submarine crew. When two target ships have identical relative bearings at the periscope the more distant ship may be dimmed to reduce the ghost effect between coincident targets.

While a number of various motors, potentiometers, and gear trains have been shown in the preferred embodiment it is clearly within the skill of one in the art to alter these components and it is not intended that the present invention be limited by the specific disclosures herein employed. We intend only to be limited by the appended claims.

We claim:

1. Apparatus for simulating the view seen through the periscope of a submarine comprising in combination: a first film having a plurality of images of a target, each image representing a different angular view of the target; a projection system for projecting a positive image of one of the images on said first film on an otherwise dark screen, said projection system including means for varying the size of the positive image to simulate varying ranges for the target and including means for causing the positive image to move across the screen to simulate bearing movement of the target; means for moving said first film to simulate a change in the angular aspect of the target; a television system including a special effects device for viewing the positive image of the target on the screen and creating a negative image wherein the target appears dark in an otherwise light environment; a second film having a continuous image of background including sea and sky; means for projecting the negative image through the second film to create a composite image of the background with a dark portion therein representing the target; means for moving said second film so as to simulate movement of the target with respect to the background; simulated periscope viewing means having a fixed portion positioned to view the image of the target on the screen and having a movable portion rotatable to simulate the action of a periscope, the fixed portion of said simulated periscope including means combining the composite image and the image of the target as received on the screen to superimpose the image of the target from the screen with the dark portion of the target on the composite image to produce a montage of the target in the background; and means connecting the movable portion of said simulated pericope to said projection system and to the means for moving said second film to cause movement of the target on the screen and simultaneously cause movement of the background when the movable portion of said simulated periscope is rotated.

2. Apparatus for simulating the view of an object movable with respect to the observer and with respect to a natural background comprising, in combination: a projection system including a first film upon which various angular positions of the object have been recorded, a screen upon which a desired one of the positions is imaged, a lens system operable to vary the size of the image on the screen to simulate various ranges of the object with respect to the observer, and means to cause the image to move across the screen to simulate motion of the object with respect to the observer; means viewing the screen and operable to produce a source of light having therein a dark portion representative of the object as seen on the screen; a second film upon which a natural background has been recorded; means causing the light from the source of light to pass through the second film to create a composite image of the natural background having therein a dark portion representative of the object; viewing means situated to receive the image from the screen and the composite image to create a montage wherein the image of the object from the screen occupies the space of the dark portion in the composite image.

3. An optical system for simulating the viewing of a movable object in a natural background comprising, in combination: first film means having an image of the movable object thereon; projection means including rotatable reflective means for projecting the image of the movable object on an otherwise dark screen; motor means for rotating the rotatable reflective means to cause the image of the movable object to move across the screen; first viewing means operable to reverse the light and dark portions of the screen and produce a dark image of the movable object on an otherwise light area; second film means having an image of the natural background thereon; means viewing the dark image and light area through the second film to create a composite image of the background with the dark image of the movable object therein; second viewing means simultaneously viewing the image of the movable object on the screen and the composite image to create a montage wherein the image of the movable object seen on the screen is superimposed with the dark image seen on the composite image to simulate the object in a natural background, with no ghost effect.

4. Apparatus for simulating a target moving with respect to a background comprising, in combination: a first film having pictures of the target thereon; a first lens system projecting the target on a screen; a television camera observing the screen; a television receiver connected to the said television camera and presenting a silhouette of the target; a second film having a continuous background picture thereon; a second lens system situated to receive the light from said television receiver through the background picture so that an image of the background with a dark portion representative of the target is created; viewing means for creating an image of the target as seen on the screen; and combining means superimposing the image of the target created by said viewing means with the image of the background so that the image of the target appears in the dark position of the background image.

5. Apparatus of the class described comprising, in combination: means producing a light image of a target on an otherwise dark screen; means viewing the image and operable to produce a source of light with a dark portion representative of the target thereon; a background film illuminated by the source of light; means viewing the background film as illuminated by the source of light to produce an image of the background with a dark portion representative of the target therein; means viewing the screen to produce a second image of the target; and means combining the second image of the target and the image of the background so that the second image of the target fills the dark portion in the image of the background.

6. Apparatus of the class described comprising, in combination: a projection system operable to project a target image on a screen; means viewing the target image and producing a silhouette of the target, a background film; lens means operable to receive the silhouette through the background film and create a background image with a dark portion representative of the target image; and means simultaneously receiving the target image and the background image to create a composite image with the target image situated in the dark portion of the background image.

7. Apparatus of the class described, comprising in combination: means producing a first positive image of an object; means viewing the first positive image and creating a corresponding dark image of the object in otherwise light surroundings; means projecting the dark image and light surroundings through a background image to create a first composite image of the background image and the dark image; means viewing the first positive image to create a second positive image; and means receiving the second positive image and the first composite image to create a second composite image with the second positive image superimposed on the dark image in the background image.

8. Apparatus of the class described comprising, in combination: first means viewing an object and creating a dark silhouette image of the object in an otherwise light surrounding; light transmissive means having a natural background image thereon; means viewing the silhouette image through the light transmissive means to create a composite; second means viewing the object simultaneously with said first means and creating a natural representation of the object; and means combining the natural representation of the object with the composite to create a natural image of the object in a natural background.

References Cited by the Examiner
UNITED STATES PATENTS

| | | | |
|---|---|---|---|
| 2,073,370 | 3/1937 | Goldsmith et al. | 178—6 |
| 2,307,661 | 1/1943 | Batchelor | 178—6 |
| 2,501,958 | 3/1950 | O'Brien | 88—24 |
| 2,566,713 | 9/1951 | Zworykin | 178—5.4 |
| 2,568,166 | 9/1951 | Perry | 178—6 |
| 2,584,265 | 2/1952 | Gillette | 178—7.2 |
| 2,591,752 | 4/1952 | Wicklund | 35—12 |
| 2,723,307 | 11/1955 | Baracket | 178—6 |
| 2,730,565 | 1/1956 | Owens | 178—6 |
| 2,938,279 | 5/1960 | Hemstreet et al. | 35—12 |
| 3,039,204 | 6/1962 | Bryan et al. | 35—10.2 |

EUGENE R. CAPOZIO, *Primary Examiner.*

LEO SMILOW, GEORGE A. NINAS, JEROME SCHNALL, *Examiners.*